Sept. 22, 1936.  A. H. ADAMS  2,054,800

LOAD SUPPORTING DEVICE FOR AUTOMOBILES

Filed Oct. 1, 1934  2 Sheets—Sheet 1

Inventor
A. H. Adams,
By Row & Row
Attorneys.

Sept. 22, 1936.   A. H. ADAMS   2,054,800
LOAD SUPPORTING DEVICE FOR AUTOMOBILES
Filed Oct. 1, 1934   2 Sheets-Sheet 2
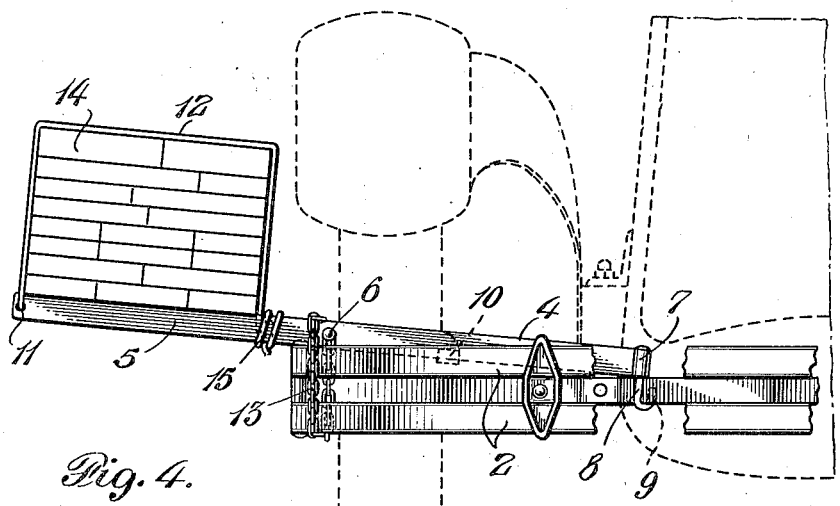
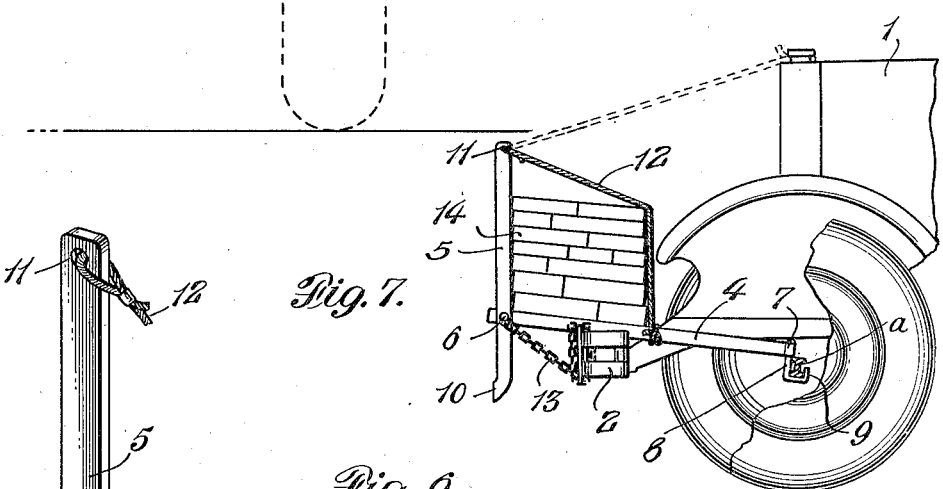
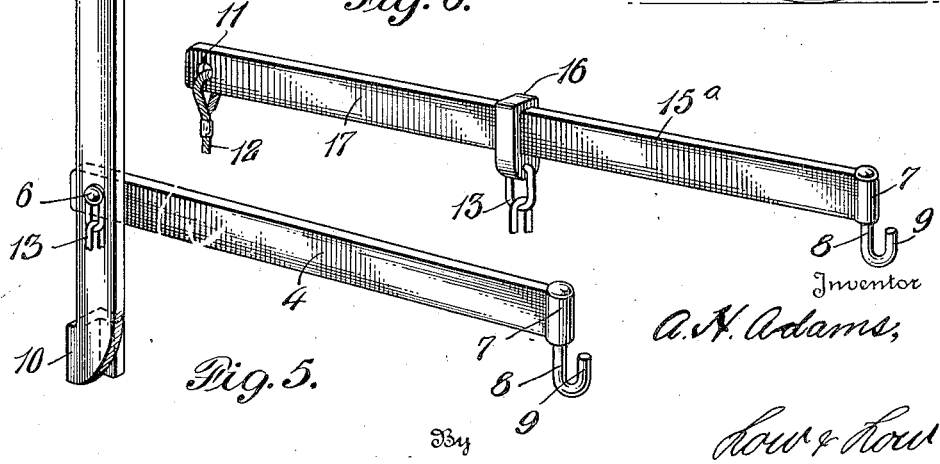

Patented Sept. 22, 1936

2,054,800

UNITED STATES PATENT OFFICE 2,054,800

LOAD SUPPORTING DEVICE FOR AUTOMOBILES

Arthur H. Adams, Jasper, Minn.; Robert L. Palmer administrator of said Arthur H. Adams, deceased Application October 1, 1934, Serial No. 746,455

4 Claims. (Cl. 224—29)

The invention relates to load or luggage carrying devices for automobiles and has for its objects to provide certain new and useful improvements in devices of this character.

An important object of the invention is an auto carrier device of the character described in which provision is made for supporting and transporting bulky or elongated loads both longitudinally and transversely of the car. Such loads may consist for example of lumber or other elongated and bulky objects which are ordinarily difficult to transport by means of an automobile.

A further object of the invention is to provide an efficient device of the character described which is capable of economical manufacture and convenient attachment to the automobile, as well as being composed of few parts.

A still further object is to provide an auto carrier device which may be conveniently and removably secured to the front or rear bumpers, or both, of various automobiles of standard make without necessitating structural modifications in the device to adapt the same for various standard type bumpers as now constituting stock equipment on automobiles of popular manufacture.

A further object is to provide a load carrying device for automobiles which may be moved into a non-carrying or carrying position without requiring that the same be detached from the automobile to which it is applied. If desired the carrier device is designed so as to transport the load longitudinally of the automobile adjacent the running board, or transversely thereof at either the front or rear end of the car.

With such objects in view, as well as other advantages which may be incident to the use of the improvements, the invention consists in the use of the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration.

In said drawings,

Fig. 4 is a view in elevation of one of the load supporting elements removably secured to the automobile bumper and showing the load removably secured to the outer end of said element.

Fig. 5 is a perspective view of the carrier element illustrated in Fig. 2, but showing the said element in a second carrying or folded position.

Fig. 6 is a perspective view of a modified form of load supporting and carrying element.

Fig. 7 is a view in elevation showing one of the members illustrated in Fig. 5 in position to support one end of a load disposed transversely of the automobile at one end thereof.

Figure 3:
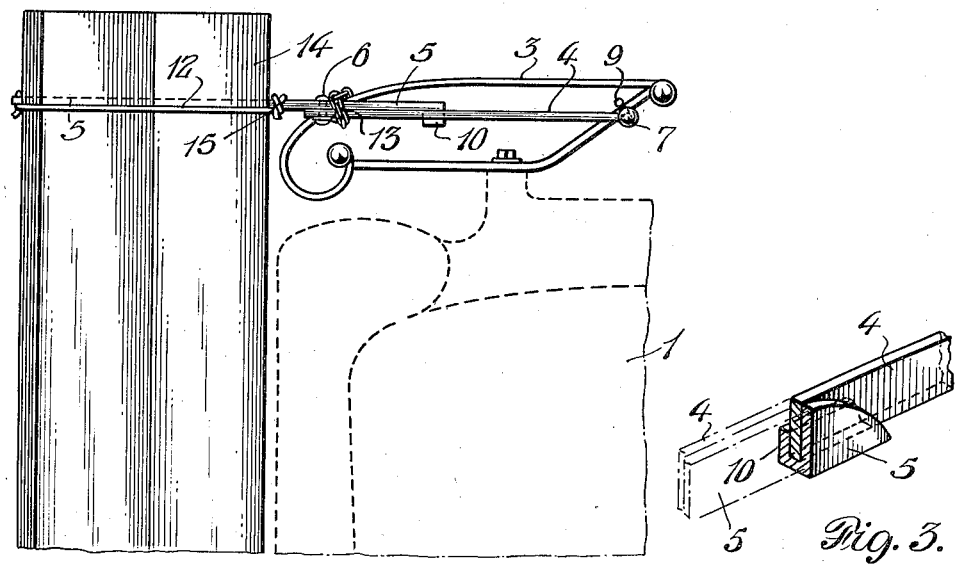
Fig. 3 is a detail perspective view, partially in vertical section, through one of the load supporting members constituting the invention.

Referring to the drawings, 1 indicates in dotted lines the automobile having the usual front bumper member 2 and rear bumper member 3 attached thereto. Said bumpers may be any type or form as now manufactured and applied as stock equipment to a variety of standard cars of known manufacture and design. The type of bumper which has been illustrated herein is to be understood as merely illustrative of such bumper designs.

Figure 1:
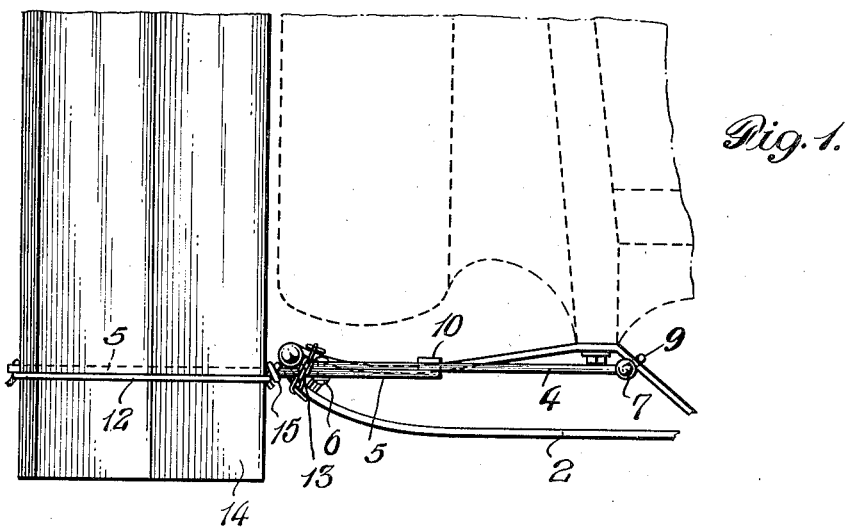
Fig. 1 is a plan view of the auto carrier shown in load supporting position and attached to the front and rear bumpers of an automobile.
Figure 2:
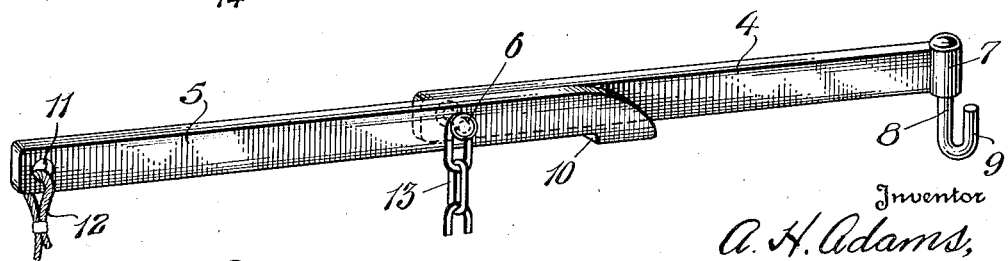
Fig. 2 is a perspective view of one of the load supporting members detached.

In a preferred embodiment of the invention the same consists of a pair of companion load supporting elements or members of identical construction, one of which is illustrated in Fig. 2, said members being designed to be removably secured to the described front and rear bumpers 2 and 3 of the automobile as shown in Figure 1. Each load supporting element consists of an inner member or bar 4 of rectilinear configuration, and an outer load supporting member 5 pivotally secured to the member 4 as by a bolt 6 or other securing means. The members or bars 4 and 5 are preferably constructed of forged mild tempered steel or other strong metal, so as to be capable of supporting relatively heavy loads when desired. The member 4 is curled or otherwise shaped at its inner end to provide an apertured extremity or boss 7 in which a headed carriage bolt 8 is swiveled or loosely engaged so as to be rotatable as well as longitudinally movable relative to the member 4. The inner end of the carriage bolt 8 is preferably turned upwardly upon itself to provide a hook formation as indicated at 9.

The inner end of the load supporting member or bar 5 is forged or otherwise constructed so as to provide an offset hooked portion 10 designed to engage beneath the member 4 so as to limit relative pivotal movement of said members in one direction and to provide a substantially straight composite bar when in one load supporting position as best seen in Fig. 2. The outer end of the bar member 5 is preferably apertured as at 11 to receive a flexible rope or wire cable, a portion of which is shown at 12 (Fig. 2). This cable or rope is preferably of sufficient length to encompass or surround various loads as may be supported by the device, and to secure the same thereto. A flexible chain or rope member 13 is or may be secured intermediate the device, for example to the pivotal portion 6 of the composite bar member, and is of sufficient length to permit the carrier to be removably and securely attached to the outer portion of a bumper member as shown in Figs. 1 and 4.

In the use of the device the carriage bolt 8 is hooked beneath a convenient portion of the automobile bumper as in Fig. 4, the swivel connection between the bolt and the bar permitting convenient flexible adjustment for the purpose. The intermediate portion of the carrier preferably is supported by an outer part of the bumper and is secured in rigid relation thereto by means of the chain member 13 or rope which is of sufficient length to be wrapped one or more times about the bumper and bar so as to effect such removable attachment. When secured to the bumper in the manner described, the outer pivotally mounted load supporting bar 5 projects substantially horizontally or at a slight inclination away from the automobile and laterally thereof. This is true of each composite supporting member or carrier device which is secured as described, one to the front bumper and one to the rear bumper of the car. The carrier device is particularly designed for bulky and elongated loads, such as lumber and the like which may not otherwise be conveniently transported by automobile. The load to be carried, for example a quantity of lumber indicated at 14, is then placed on the outer supporting bars 5 and is secured to each of the latter by means of the respective ropes or cable members 12 as best seen in Figs. 1 and 4. After passing one or more times around the load the flexible rope member 12 may be knotted in position on the bar member 4 as indicated at 15. The pivotally mounted load supporting members 5 are maintained in load supporting position by the engagement of their hook portions 10 beneath the inner rigidly secured bar members 4 as hereinabove described.

After the load has been removed from the device the outer members 5 may be swung upwardly relative to the members 4, as indicated in Fig. 5, and maintained in such position by suitably attaching the outer end of the flexible member 12 to the bumper or car. In this manner the carrier device may be carried by the car in an out of the way and non-supporting position without projecting laterally of the automobile to such extent as to constitute an obstruction or encumbrance.

As best seen in Fig. 7 the described pair of carrier bars may be employed to transport the load at the front or back of the machine. When utilized in such manner the inner bar member 4 projects longitudinally of the machine and is supported by the front or rear bumper thereof. The swiveled carriage bolt 8 may engage beneath the axle $a$ or other rigid part of the car frame, and the device is secured against displacement relative to the bumper by means of the chain 13. The outer member 5 of the device may be swung into substantially vertical position so as to brace and retain the load 14 as illustrated. The flexible securing member 12 may be attached to a fixed part of the car such as the radiator cap, or passed one or more times around the load and have its free end secured to the bumper or inner bar member 4 so as to fasten the load in place on the respective carrier members. The nature of the invention is such as to render the flexible member 12 attachable at any desired or convenient point on the car or carrier device, depending upon the nature and dimensions of a particular load to be transported.

Fig. 6 shows a modification of the invention in which each carrier device for the opposite ends of the load consists of a single rigid bar member 15ª as distinguished from the two-part device illustrated in Fig. 5. In the embodiment illustrated in Fig. 6 the bumper attaching chain 13 or other flexible member is secured to a block member 16 which is slidably mounted on the bar so as to permit flexibility and adjustment when securing the bar 15ª to various bumpers in the manner as has been hereinabove described. The lumber or other load is designed to be carried or supported by the outer portion 17 of the bar 15ª, which portion corresponds to the member 5 in the two-part device. It will be obvious that the modified form of carrier may not be folded into a second carrying position or into a non-carrying position as has been above described in respect to the two part or composite bar member. The straight bar type of carrier is of particular utility when the load is to be carried on the rear end of the automobile, it being understood that a said bar is provided and attached at each end of the bumper or to each bumperette so as to project rearwardly of the automobile. The load is supported at each end on one of the straight bars, two of which are attached to the bumpers in the manner above described. The same procedure in regard to the straight bars may be employed at the front end of the machine and the load will be supported in advance of the automobile and by the front bumper or bumpers as suggested in Fig. 7 of the drawings, wherein the two part carrier however is specifically illustrated.

When not in use the carrier bar members may be folded one upon the other and stored in a relatively small space such as beneath the seat or in a compartment or tool box of the automobile. When used at the front of the automobile as illustrated in Figure 7, the device projects sufficiently in advance of the car so as not to interfere or contact with the front wheels when the latter are turned during steering.

The swiveled carriage bolt 8 need not necessarily engage the bumper of the car as illustrated but is of such character as may be engaged with any conveniently located frame part in such manrier as to brace the carrier bar or bars against downward movement under the load.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

What I claim is:

1. In a load carrier for automobiles, the combination of a pair of load supporting bar members, each having hooked portions at their inner ends for respectively removably engaging below the front and rear bumpers of the automobile, a flexible member attachable to an intermediate portion of each of said bar members for removably securing the same to and above said bumpers, and a flexible tie member secured at one end to the outer portion of each of said bar members for removably securing the load thereto, whereby said load is supported at its opposite ends by said bar members longitudinally of the automobile.

2. A load supporting device for automobiles, adapted to be removably secured to the bumper elements thereof, said device comprising a pair of companion bar members, each including an inner bumper engaging portion and an outer load supporting portion pivotally secured to said inner portion and having a hooked part engageable with the latter to limit relative pivotal movement of said members in one direction, a hook member on said inner portion for engaging beneath a bumper, a flexible chain having one end attached to the pivotal connection between said bar members for securing the inner portion of the same to the bumper, and a flexible tie rope secured to said outer portion for securing the load thereto, the pivotal mounting of said portions permitting the same to be adjustable to a plurality of load supporting and engaging positions and to a completely folded or dismantled position.

3. A load supporting device for automobiles adapted to be removably secured to the bumper elements thereof, said device comprising a pair of rigid companion bar members, each including an inner bumper engaging portion and an outer load supporting portion, means on said inner portion for removably engaging a bumper, flexible means having one end attached to and adjustable along said bar member for removably securing the same to the bumper, and flexible means attachable at one end to said outer portion for securing the load thereto, whereby the load to be transported is supported at each end by one of said companion bar members.

4. A load supporting device for automobiles, adapted to be removably secured to the bumper elements thereof, said device comprising an inner bumper engaging member and an outer load supporting member pivotally secured to said inner member and having an off-set part engageable with the latter to limit relative pivotal movement of said members in one direction, a hook having a swivel mounting on said inner member for engaging beneath a bumper, flexible means having one end attached to the pivotal connection between said members for securing the inner member to the bumper, and flexible means secured to said outer portion for securing the load thereto, the pivotal mounting of said portions permitting the same to be adjustable to a plurality of load supporting and engaging positions and to a completely folded and dismantled position.

ARTHUR H. ADAMS.